United States Patent Office 3,536,813
Patented Oct. 27, 1970

3,536,813
1-CYCLOALKENYL-4-PHENYL-4-ACYL-PIPERIDINES AS ANALGESICS
Herbert Merz, Hans-Detlef Schroeder, Adolf Langbein, and Karl Zeile, Ingelheim am Rhein, Germany, assignors to Boehringer Ingelheim G.m.b.H., Ingelheim am Rhein, Germany, a corporation of Germany
No Drawing. Continuation-in-part of application Ser. No. 561,389, June 29, 1966. This application May 22, 1968, Ser. No. 731,318
Claims priority, application Germany, June 29, 1965, B 82,611
Int. Cl. A61k 27/00
U.S. Cl. 424—267    2 Claims

ABSTRACT OF THE DISCLOSURE

The compounds are 1-cycloalkenyl-4-phenyl-4-lower alkanoyl-piperidines and nontoxic acid addition salts thereof useful as analgesics in warm-blooded animals.

---

This is a continuation-in-part of copending application Ser. No. 561,389, filed June 28, 1966, now U.S. Pat. 3,438,990.

This invention relates to novel 1-cycloalkenyl-piperidines and acid addition salts thereof, as well as to a process of preparing such compounds.

More particularly, the present invention relates to novel 1-cycloalkenyl-4-phenyl-4-lower alkanoyl-piperidines of the formula

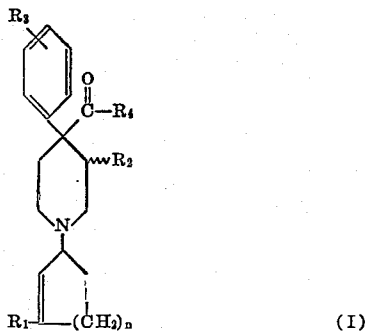

wherein
$R_1$ is hydrogen, chlorine or bromine,
$R_2$ is hydrogen, α-methyl or β-methyl,
$R_3$ is m-hydroxyl, p-hydroxyl, m-methoxy or p-methoxy,
$R_4$ is methyl, ethyl or propyl, and
$n$ is an integer from 1 to 4, inclusive, and their nontoxic, pharmacologically acceptable acid addition salts.

The compounds according to the present invention may be prepared by reacting a secondary 4-phenyl-4-lower alkanoyl-piperidine of the formula

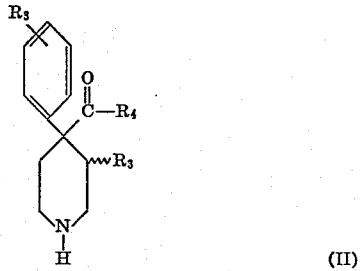

wherein $R_2$, $R_3$ and $R_4$ have the same meanings as in Formula I, or an acid addition salt thereof, with a cycloalkene compound of the formula

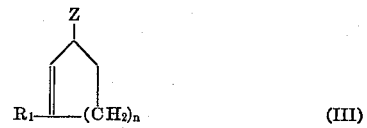

wherein $R_1$ and $n$ have the same meanings as in Formula I and Z is halogen or p-toluenesulfonyloxy.

The reaction between compounds II and III is preferably carried out in the presence of an inert organic solvent, such as a lower alkanol or a mixture of dimethylformamide and tetrahydrofuran, and in the presence of a weak base at a temperature between 50 and 150° C. The reactants may be employed in a molar ratio of 1:1, but it is preferred if compound III is provided in excess of 1 mol per mol of compound II.

In those instances where $R_3$ in the reaction product of the Formula I is hydroxyl, this hydroxyl group may subsequently be methylated, if desired, by conventional methods; and conversely, if $R_3$ in the reaction product is methoxy, this methoxy substituent may be demethylated by conventional methods.

The compounds of the Formula I are bases and, therefore, form acid addition salts with inorganic and organic acids. Examples of nontoxic, pharmacologically acceptable acid addition salts are those wormed with hydrochloric acid, hydrobromic acid, sulfuric acid, phosphoric acid, nitric acid, acetic acid, methanesulfonic acid, tartaric acid, furamic acid, maleic acid, cictric acid, asorbic acid, caproic acid, propionic acid, 8-chlorotheophylline and the like.

The secondary 4-phenyl-4-lower alkanoyl-piperidines II required as starting materials for the preparation of the compounds according to the present invention may themselves be prepared by known methods, such as by the processes described in Chemische Berichte 74, 1433 (1941); German Pat. 679,281; Swiss Pat. 236,312; and U.S. Pat. 3,004,877.

Using these processes, the following starting compounds of the Formula II were prepared:

| | M.P., ° C. |
|---|---|
| 4-(3-hydroxyphenyl)-4-acetyl-piperidine | 205 |
| 4-(3-hydroxyphenyl)-4-propionyl-piperidine | 223 |
| 4-(3-hydroxyphenyl)-4-butyryl-piperidine·HCl | 216 |
| 4-(3-methoxyphenyl)-4-propionyl-piperidine·HCl | 202 |
| 4-(4-hydroxyphenyl)-4-propionyl-piperidine | 166 |
| α-3-methyl-4-(3-hydroxyphenyl)-4-propionyl-piperidine | 209 |

The following examples further illustrate the present invention and will enable others skilled in the art to understand it more completely. It should be understood, however, that the instant invention is not limited to the particular examples given below.

EXAMPLE 1

Preparation of 1-(3-chloro-2-cycloheptenyl)-4-(3-hydroxyphenyl)-4-propionyl-piperidine hydrochloride A mixture of 2.33 gm. (0.01 mol) of 4-(3-hydroxyphenyl)-4-propionyl-piperidine, 1.56 gm. (0.015 mol) of sodium carbonate, 2.3 gm. (0.011 mol) of 1-chloro-3-bromo-cycloheptene and 35 cc. of ethanol was refluxed for six hours. Thereafter, the solvent was removed by vacuum distillation, and the residue was extracted with chloroform and water. The aqueous phase was separated and again extracted with chloroform, and the combined chloroform extract solutions were washed with water and dried with sodium sulfate. The chloroform was evaporated, leaving the raw reaction product as a residue. The raw product was dissolved in 20 cc. of chloroform, the solution was filtered through a chromatographic column with 75 gm. of aluminum oxide (neutral aluminum oxide, activity II), and the column was washed with chloroform. The filtrate was evaporated, leaving pure crystalline 1-(3-chloro - 2 - cycloheptenyl) - 4 - (3 - hydroxyphenyl) - 4-propionyl-piperidine as a residue.

The residue was dissolved in 20 cc. of ethanol, the solution was acidified with 4 cc. of 2.5 N ethanolic hydrochloric acid, and then ether was added to the solution until it became cloudy. The solution was cooled, the precipitate formed thereby was separated by vacuum filtration, and the filter cake was washed with ether. 2.0 gm. (50% of theory) of a substance having a melting point of 219° C. were obtained; it was identified to be the hydrochloride of 1-(3-chloro-2-cycloheptenyl)-4-(3 - hydroxyphenyl)-4-propionyl-piperidine of the formula

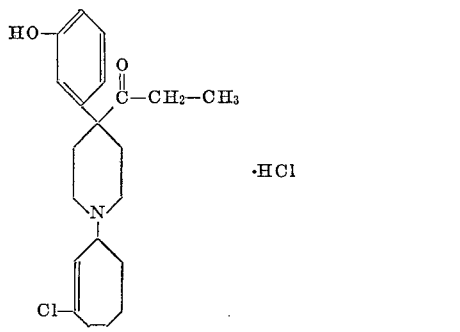

were obtained.

EXAMPLE 2

Using a procedure analogous to that described in Example 1, 1-(2-cyclopentenyl)-4-(3-hydroxyphenyl) - 4-propionyl-piperidine and its hydrochloride, M.P. 206° C., of the formula

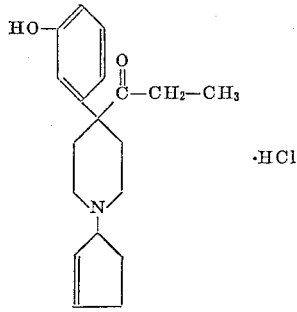

were prepared from 4 - (3-hydroxyphenyl)-4-propionyl-piperidine and 1-bromo-cyclopentene-2. The yield of hydrochloride was 45% of theory.

EXAMPLE 3

Using a procedure analogous to that described in Example 1, 1-(2-cyclohexenyl) - 4 - (3-hydroxyphenyl)-4-acetyl-piperidine and its hydrochloride, M.P. 234° C., of the formula

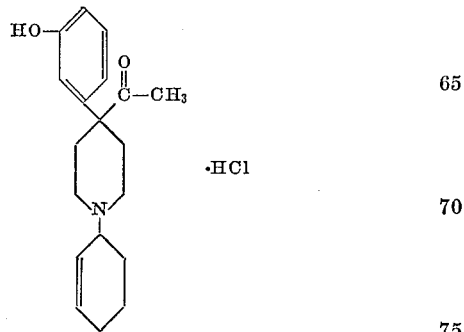

were prepared from 4-(3-hydroxyphenyl)-4-acetyl-piperidine and 1-bromo-cyclohexene-2. The yield of hydrochloride was 68% of theory.

EXAMPLE 4

Using a procedure analogous to that described in Example 1, 1 - (2 - cyclohexenyl)-4-(3-hydroxyphenyl)-4-propionyl-piperidine and its hydrochloride, M.P. 202° C., were prepared from 4 - (3-hydroxyphenyl)-4-propionyl-piperidine and 1-bromo-cyclohexene-2. The yield of hydrochloride was 58% of theory.

EXAMPLE 5

Using a procedure analogous to that described in Example 1, 1 - (2 - cyclohexenyl)-4-(3-hydroxyphenyl)-4-butyryl-piperidine and its hydrochloride, M.P. 150° C., of the formula

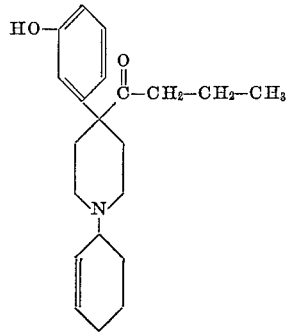

were prepared from 4 - (3 - hydroxyphenyl)-4-butyryl-piperidine hydrochloride and 1-bromo-cyclohexene-2. The yield of hydrochloride was 70% of theory.

EXAMPLE 6

Using a procedure analogous to that described in Example 1, 1 - (2 - cyclohexenyl) - 4 - (3-methoxyphenyl)-4-propionyl-piperidine and its hydrochloride, M.P. 157° C., were prepared from 4-(3-methoxyphenyl)-4-propionyl-piperidine hydrochloride and 1-bromo-cyclohexene-2. The yield of hydrochloride was 60% of theory.

EXAMPLE 7

Using a procedure analogous to that described in Example 1, 1 - (2 - cyclohexenyl)-3α-methyl-4-(3-hydroxyphenyl) - 4 - propionyl-piperidine and its hydrochloride, M.P. 206° C., were prepared from 3α-methyl-4-(3-hydroxyphenyl)-4-propionyl-piperidine and 1-bromo-cyclohexene-2. The yield of hydrochloride was 49% of theory.

EXAMPLE 8

Using a procedure analogous to that described in Example 1, 1 - (2 - cyclohexenyl) - 4 - (4-hydroxyphenyl)-4-propionyl-piperidine and its hydrochloride, M.P. 232° C., of the formula

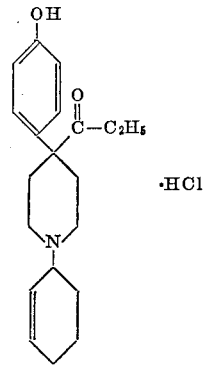

were prepared from 4-(3-hydroxyphenyl) - 4 - propionyl-piperidine and 1-bromo-cyclohexene-2. The yield of hydrochloride was 56% of theory.

EXAMPLE 9

Using a procedure analogous to that described in Example 1, 1 - (2 - cycloheptenyl) - 4 - (3-hydroxyphenyl)-4-propionyl-piperidine and its hydrochloride, M.P. 204° C., were prepared from 4-(3-hydroxyphenyl)-4-propionyl-piperidine and 1-bromo-cycloheptene-2. The yield of hydrochloride was 53% of theory.

EXAMPLE 10

Using a procedure analogous to that described in Example 1, 1 - (2 - cycloheptenyl) - 4 - (3-methoxyphenyl)-4-propionyl-piperidine and its hydrochloride, M.P. 178° C., of the formula

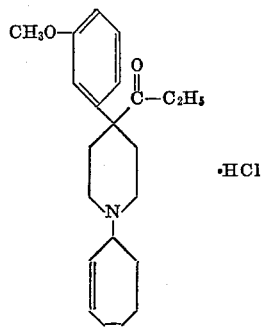

were prepared from 4-(3-methoxyphenyl)-4-propionyl-piperidine hydrochloride and 1-bromo-cycloheptene-2. The yield of hydrochloride was 43% of theory.

EXAMPLE 11

Using a procedure analogous to that described in Example 1, 1 - (2 - cyclo-octenyl)-4-(3-hydroxyphenyl)-4-propionyl-piperidine and its hydrochloride, M.P. 211° C., of the formula

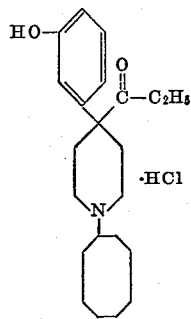

were prepared from 4-(3-hydroxyphenyl)-4-propionyl-piperidine hydrochloride and 1-bromo-cyclo-octene-2. The yield of hydrochloride was 42% of theory.

EXAMPLE 12

Using a procedure analogous to that described in Example 1, 1 - (3 - chloro-2-cyclopentenyl)-4-(3-hydroxyphenyl) - 4-propionyl-piperidine and its hydrochloride, M.P. 219° C., of the formula

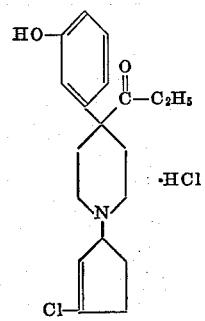

were prepared from 4-(3-hydroxyphenyl)-4-propionyl-piperidine hydrochloride and 1-chloro-3-bromo-cyclopentene. The yield of hydrochloride was 14% of theory.

EXAMPLE 13

Using a procedure analogous to that described in Example 1, 1 - (3 - chloro-2-cyclopentenyl)-4-(4-hydroxyphenyl) - 4 - propionyl-piperidine and its hydrochloride, M.P. 213° C., of the formula

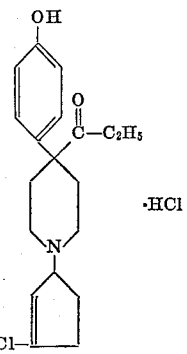

were prepared from 4-(4-hydroxyphenyl)-4-propionyl-piperidine and 1-chloro-3-bromo-cyclopentene. The yield of hydrochloride was 22% of theory.

EXAMPLE 14

Using a procedure analogous to that described in Example 1, 1 - (3 - chloro-2-cyclohexenyl)-4-(3-hydroxyphenyl)-4-acetyl-piperidine and its hydrochloride, M.P. 225° C., were prepared from 4-(3-hydroxyphenyl)-4-acetyl-piperidine hydrochloride and 1-chloro-3-bromo-cyclohexene. The yield of hydrochloride was 34% of theory.

EXAMPLE 15

Using a procedure analogous to that described in Example 1, 1 - (3 - chloro-2-cyclohexenyl)-4-(3-hydroxyphenyl)-4-propionyl-piperidine and its hydrochloride, M.P. 175° C., were prepared from 4-(3-hydroxyphenyl)-4-propionyl-piperidine and 1-chloro-3-bromo-cyclohexene. The yield of hydrochloride was 49% of theory.

EXAMPLE 16

Using a procedure analogous to that described in Example 1, 1 - (3 - chloro-2-cyclohexenyl)-4-(3-hydroxyphenyl)-4-butyryl-piperidine and its hydrochloride, M.P. 182° C., were prepared from 4-(3-hydroxyphenyl)-4-butyryl-piperidine hydrochloride and 1-chloro-3-bromo-cyclohexene. The yield of hydrochloride was 47% of theory.

EXAMPLE 17

Using a procedure analogous to that described in Example 1, 1 - (3 - chloro-2-cycloheptenyl)-4-(3-methoxyphenyl)-4-propionyl-piperidine and its hydrochloride, M.P. 179° C., of the formula

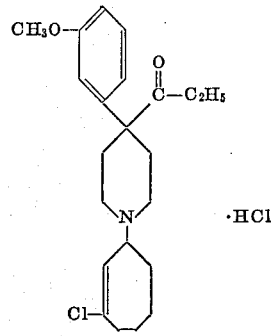

were prepared from 4-(3-hydroxyphenyl)-4-propionyl-piperidine hydrochloride and 1-chloro-3-bromo-cycloheptene. The yield of hydrochloride was 44% of theory.

EXAMPLE 18

Using a procedure analogous to that described in Example 1, 1 - (3 - chloro-2-cyclo-octenyl)-4-(3-hydroxyphenyl)-4-acetyl-piperidine and its hydrochloride, M.P. 266° C., were prepared from 4-(3-hydroxyphenyl)-4-acetyl-piperidine and 1-chloro-3-bromo-cyclo-octent. The yield of hydrochloride was 43% of theory.

EXAMPLE 19

Using a procedure analogous to that described in Example 1, 1 - (3 - chloro-2-cyclo-octenyl)-4-(3-hydroxyphenyl)-4-acetyl-piperidine and its hydrochloride, M.P. 207° C., were prepared from 4-(3-hydroxyphenyl)-4-propionyl - piperidine and 1-chloro-3-bromo-cyclo-octene. The yield of hydrochloride was 41% of theory.

EXAMPLE 20

Using a procedure analogous to that described in Example 1, 1 - (3 - chloro-2-cyclo-octenyl)-4-(3-hydroxyphenyl)-4-acetyl-piperidine and its hydrochloride, M.P. 216° C., were prepared from 4-(4-hydroxyphenyl)-4-propionyl - piperidine and 1-chloro-3-bromo-cyclo-octene. The yield of hydrochloride was 32% of theory.

The compounds according to the present invention, that is, those embraced by Formula I and their nontoxic, pharmacologically acceptable acid addition salts, have useful phamacodynamic properties. More particularly, they exhibit morphine-antagonistic properties in mice and rhesus monkeys and analgesic properties in mice. In other words, the compounds of the present invention are morphine antagonists with analgesic activity, that is, compounds which are effective analgesics in higher warm-blooded animals without physical dependence capacity (addiction liability).

For pharmaceutical purposes the compounds of the instant application are administered to warm-blooded animals perorally, parenterally or by the rectal route as active ingredients in customary dosage unit form consisting essentially of an inert pharmaceutical carrier and one dosage unit of the active ingredient, such as tablets, coated pills, emulsions, suspensions, solutions, capsules, wafers, suppositories or the like. In addition to a piperidine derivative of this invention, the dosage unit compositions may also comprise as an active ingredient an addiction-producing narcotic analgesic, such as morphine, pethidine, ketobemidone or the like. One dosage unit of the compounds according to the present invention is from 0.166 to 5.0 mgm./kg., preferably 0.83 to 2.5 mgm./kg. body weight.

The following examples illustrate a few dosage unit compositions comprising a compound of the present invention as an active ingredient, and represent the best mode contemplated of putting the invention to practical use. The parts are parts by weight unless otherwise specified.

EXAMPLE 21

Hypodermic solution

The solution was compounded from the following ingredients:

| | Parts |
|---|---|
| 1-(3-chloro-2-cyclohexenyl) - 4 - (3-hydroxyphenyl)-4-acetyl-piperidine-methane-sulfonate | 100 |
| Dextrose | 10 |
| Distilled water, q.s. ad—2000 parts by vol. | |

Compounding procedure.—The piperidine compound and the dextrose were dissolved in the distilled water, the solution was filtered until free from suspended particles, and the filtrate was filled into 2 cc.-ampules, which were thereafter sterilized and sealed. Each ampule contained 100 mgm. of the piperidine compound, and when the contents of one ampule were administered intravenously to a warm-blooded animal of about 60 kg. body weight in need of such treatment, very good analgesic effects were obtained.

EXAMPLE 22

Tablets

The tablet composition was compounded from the following ingredients:

| | Parts |
|---|---|
| 1-(3-chloro-2-cyclohexenyl) - 4 - (3-hydroxyphenyl)-2-propionyl-piperidine hydrochloride | 50 |
| Corn starch | 30 |
| Lactose | 20 |
| Colloidal silicic acid | 2 |
| Gelatin | 3 |
| Magnesium stearate | 2 |
| Talcum | 3 |
| Total | 110 |

Compound procedure.—The piperidine compound, the corn starch, the lactose and the silicic acid were thoroughly admixed with each other, the mixture was moistened with a 10% aqueous solution of the gelatin, the moist mass was forced through a 1.5 mm.-mesh screen, and the resulting granulate was dried. The dry granulate was admixed with the magnesium stearate and the talcum, and the mixture was pressed into 100 mgm. tablets. One tablet contained 50 mgm. of the active ingredient and, when administered perorally to a warm-blooded animal of about 60 kg. body weight in need of such treatment, produced very good analgesic effects.

EXAMPLE 23

Drop-solution

The solution was compounded from the following ingredients:

| | Parts |
|---|---|
| 1-(3-chloro-2-cyclohexenyl)-4-(3 - hydroxyphenyl)-4-acetyl-piperidine methanesulfonate | 10 |
| p-Hydroxy-benzoic acid methyl ester | 0.07 |
| p-Hydroxy-benzoic acid propyl ester | 0.03 |
| Ethanol | 20 |
| Polyethyleneglycol 400 | 20 |
| Distilled water, q.s. ad, 100 parts by vol. | |

Compounding procedure.—The various ingredients were dissolved in the distilled water, and the solution was filtered until clear. 1 cc. (about 5 drops) of solution contained 100 mgm. of the active ingredient and, when administered perorally to a warm-blooded animal of about 60 kg. body weight in need of such treatment, produced very good analgesic effects.

EXAMPLE 24

Suppositories

The suppository composition was compounded from the following ingredients:

| | Parts |
|---|---|
| 1-(3-chloro-2-cyclopentenyl)-4-(3 - hydroxyphenyl)-4-propionyl-piperidine hydrochloride | 150 |
| Lactose | 150 |
| Cocoa butter | 1400 |
| Total | 1700 |

Compounding procedure.—The cocoa butter was melted, cooled to about 37° C., the finely pulverized piperidine compound and the lactose were stirred in, and the mixture was homogenized. The homogeneous composition was poured into cooled suppository molds, each holding 1700 mgm. of the composition. One suppository contained 150 mgm. of the active ingredient and, when administered by the rectal route to a warm-blooded animal of about 60 kg. body weight in need of such treatment, produced very good analgesic effects.

Although the above dosage unit composition examples illustrate only two compounds according to the invention as active ingredient components, it should be understood

What is claimed is:

1. A pharmacodynamic composition in dosage unit form, consisting essentially of an inert pharmaceutical carrier and an effective analgesic amount of a compound of the formula

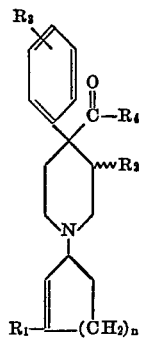

wherein $R_1$ is hydrogen, chlorine or bromine,
$R_2$ is hydrogen, α-methyl or β-methyl,
$R_3$ is m-hydroxy, p-hydroxy, m-methoxy or p-methoxy,
$R_4$ is methyl, ethyl or propyl, and
$n$ is an integer from 1 to 4, inclusive, or a non-toxic, pharmocologically acceptable acid addition salt thereof.

2. The method of producing morphine-antagonistic effects and increasing the pain threshold in warm-blooded animals, which comprises administering to said animals an effective analgesic amount of a compound of the formula

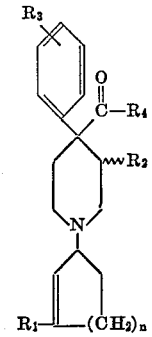

wherein $R_1$ is hydrogen, chlorine or bromine,
$R_2$ is hydrogen, α-methyl or β-methyl,
$R_3$ is m-hydroxy, p-hydroxy, m-methoxy or p-methoxy,
$R_4$ is methyl, ethyl or propyl, and
$n$ is an integer from 1 to 4, inclusive, or a nontoxic, pharmacologically acceptable acid addition salt thereof.

References Cited

UNITED STATES PATENTS 3,217,010  11/1965  Kuhnis et al. _____ 260—294.3

ALBERT T. MEYERS, Primary Examiner

J. D. GOLDBERG, Assistant Examiner

PO-1050
(5/69)

UNITED STATES PATENT OFFICE
CERTIFICATE OF CORRECTION

Patent No. 3,536,813                    Dated October 27, 1970

Inventor(s) Herbert Merz, Hans-Detlef Schroeder, Adolf Langbein and Karl Zeile

It is certified that error appears in the above-identified patent and that said Letters Patent are hereby corrected as shown below:

Col. 1, correct formula II to read:

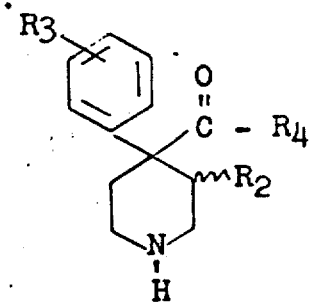

Col. 2, line 31, correct the spelling of "fumaric", "citric" and "ascorbic".

Col. 5, line 47, correct the formula to read:

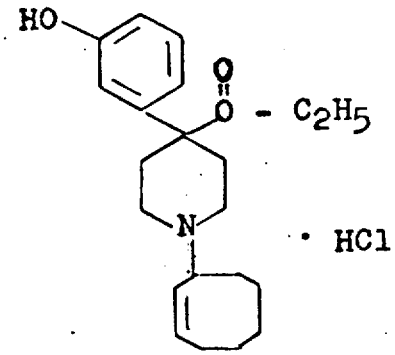

Col. 7, line 18, "3-hydroxy" should read --4-hydroxy--;
       line 19, "acetyl"    should read --propionyl--.

Signed and sealed this 30th day of March 1971.

(SEAL)
Attest:

EDWARD M. FLETCHER, JR.           WILLIAM E. SCHUYLER, JR.
Attesting Officer                  Commissioner of Patents